Sept. 28, 1926.
W. H. BELL
1,601,552
INSECT TRAP
Filed Feb. 2, 1926
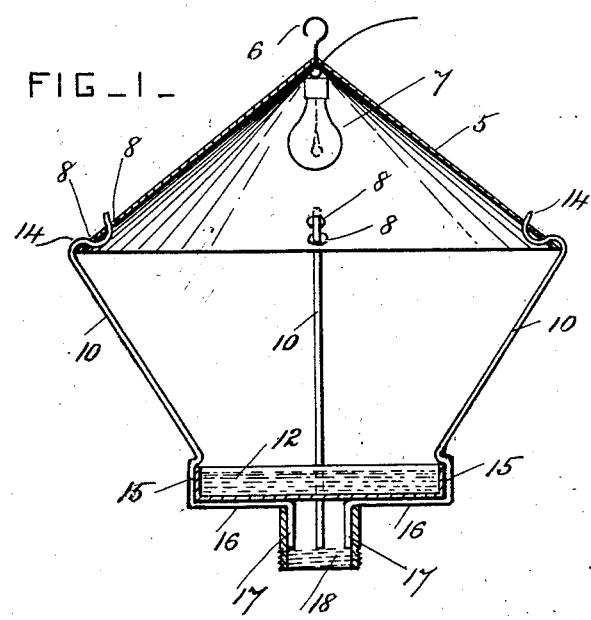
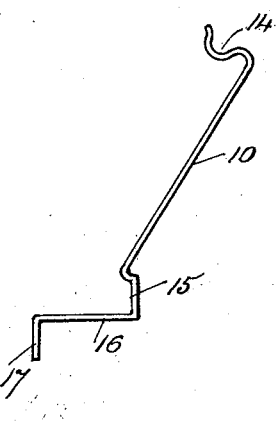
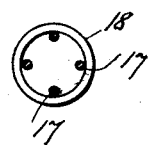
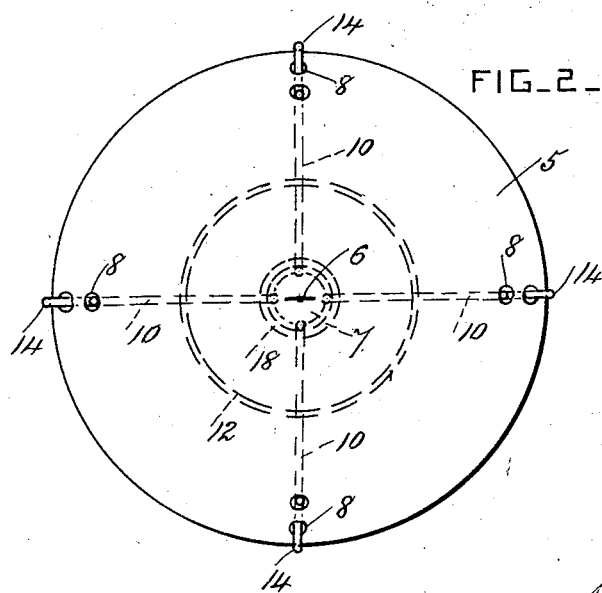

Patented Sept. 28, 1926.

1,601,552

UNITED STATES PATENT OFFICE.

WILLIAM H. BELL, OF ALACHUA, FLORIDA.

INSECT TRAP.

Application filed February 2, 1926. Serial No. 85,518.

This invention relates to traps for catching and killing insects which are injurious to vegetation or which are otherwise harmful to man; and it consists in the novel construction and combination of the parts hereinafter fully described and claimed.

In the drawings, Figure 1 is a vertical section through an insect trap constructed according to this invention. Fig. 2 is a plan view of the trap, from above. Fig. 3 is a detail side view of one of the rods which support the pan and the conical top. Fig. 4 is a plan view of the collar showing the vertical end portions of the rods in section.

The trap is provided with a conical top 5 of thin sheet metal or similar material. A hook 6 is provided at the apex of the top for convenience in suspending the trap from any convenient support, and a source of light 7 is suspended inside the top. This source of light may be an incandescent electric light bulb, or any lamp or lantern. The top has holes 8 near its bottom edge, spaced apart around it, and arranged in pairs. Each pair of holes is arranged radially of the center of the top.

A series of rods 10 is provided for supporting the top and the pan 12 which is placed vertically under the top and at a predetermined distance from it. Four similar rods 10 are preferably provided, and each rod has a doubly curved end portion 14 at its top which is slipped into engagement with one pair of holes 8. The main portions of the rods are inclined downwardly and inwardly, and have offset sockets 15 below the sockets.

The pan 12 is of any suitable material that will hold liquid, and it is supported in the sockets 15 by the horizontal portions 16 of the rods. The horizontal portions 16 have vertical end portions 17 at their ends, and 18 is a collar which is slipped over the end portions 17 which are sprung towards each other. The collar 18 is screwthreaded externally for convenience in attaching it to a tubular post, when the trap can more conveniently be supported from a post than by being suspended by the hook at its top. The resilience of the rods holds them in engagement with the collar, and the whole trap can be quickly put together, or taken apart for shipment.

Water is placed in the pan, and oil is floated on the water, or any other convenient liquid or substance that will destroy insect life is placed in the pan. The insects are attracted by the light, and fall into the pan in large numbers, and are destroyed by the liquid in the pan. These traps can be manufactured in large quantities with but little expense.

What I claim is:—

1. An insect trap, comprising a conical top adapted to cover a source of light, rods having their upper end portions disengageably attached to the lower part of the top, said rods having sockets, horizontal portions and vertical end portions at their lower parts, a collar engaging with the said vertical end portions, and a pan supported in the said sockets on the said horizontal end portions of the rods.

2. An insect trap, comprising a conical top adapted to cover a source of light and having holes arranged in pairs around its lower part, rods having doubly curved upper end portions which are slid into the pairs of holes in the top, said rods having sockets, horizontal portions and vertical end portions at their lower parts, a collar engaging with the said vertical end portions, and a pan supported in the said sockets on the said horizontal end portions of the rods.

In testimony whereof I have affixed my signature.

WILLIAM H. BELL.